US011598668B2

(12) United States Patent
Hoeh et al.

(10) Patent No.: US 11,598,668 B2
(45) Date of Patent: Mar. 7, 2023

(54) METHOD AND APPARATUS FOR MONITORING A SPECTRAL RADIOMETER

(71) Applicant: Instrument Systems Optische Messtechnik GmbH, Munich (DE)

(72) Inventors: Matthias Hoeh, Munich (DE); Reto Haring, Munich (DE); Florian Schewe, Munich (DE); Martin Mangstl, Munich (DE); Thorsten Kopp, Neubiberg (DE)

(73) Assignee: Instrument Systems Optische Messtechnik GmbH, Munich (DE)

( * ) Notice: Subject to any disclaimer, the term of this patent is extended or adjusted under 35 U.S.C. 154(b) by 0 days.

(21) Appl. No.: 17/268,932

(22) PCT Filed: Aug. 9, 2019

(86) PCT No.: PCT/EP2019/071479
§ 371 (c)(1),
(2) Date: Feb. 16, 2021

(87) PCT Pub. No.: WO2020/035418
PCT Pub. Date: Feb. 20, 2020

(65) Prior Publication Data
US 2021/0270670 A1    Sep. 2, 2021

(30) Foreign Application Priority Data
Aug. 16, 2018 (DE) .................... 10 2018 120 006.4

(51) Int. Cl.
*G01J 3/02* (2006.01)
*G01J 3/28* (2006.01)
*G01J 3/52* (2006.01)

(52) U.S. Cl.
CPC .......... *G01J 3/0286* (2013.01); *G01J 3/0218* (2013.01); *G01J 3/0251* (2013.01); *G01J 3/28* (2013.01);
(Continued)

(58) Field of Classification Search
CPC .......... G01J 3/02; G01J 3/0286; G01J 3/0218; G01J 3/0251; G01J 3/28; G01J 3/524;
(Continued)

(56) References Cited

U.S. PATENT DOCUMENTS

| 4,708,477 A | 11/1987 | Kenji et al. | |
| 2005/0213092 A1* | 9/2005 | MacKinnon | G01J 3/42 356/336 |

(Continued)

FOREIGN PATENT DOCUMENTS

CN    101354287 A    1/2009

OTHER PUBLICATIONS

PCT International Search Report for priority application PCT/EP2019/071479; dated Oct. 30, 2019; 6 pages.

*Primary Examiner* — Abdullahi Nur
(74) *Attorney, Agent, or Firm* — Adams and Reese LLP; Ray R. Ferrera

(57) ABSTRACT

The invention relates to a method for monitoring a spectroradiometer (4), in particular for measuring light-emitting test objects (1), in which the spectral data of the test objects (1) are captured by means of an optical system, wherein the radiometric, photometric and/or colorimetric quantities of the test objects (1) are ascertained from the spectral data. The problem addressed by the invention is that of specifying a method for monitoring a spectroradiometer (4), where it is not the continuous recalibration of the spectroradiometer (4) but the monitoring of when a calibration is necessary that is paramount. The invention solves this problem by virtue of changes in the wavelength scale, in the light throughput and/or in the spectral sensitivity of the spectroradiometer (4) being detected by way of a reference light source (5), integrated into the optical system, with a defined spectrum. Optionally, at least one detector integrated into the optical system can additionally monitor the stability of the reference
(Continued)

Figure 1:
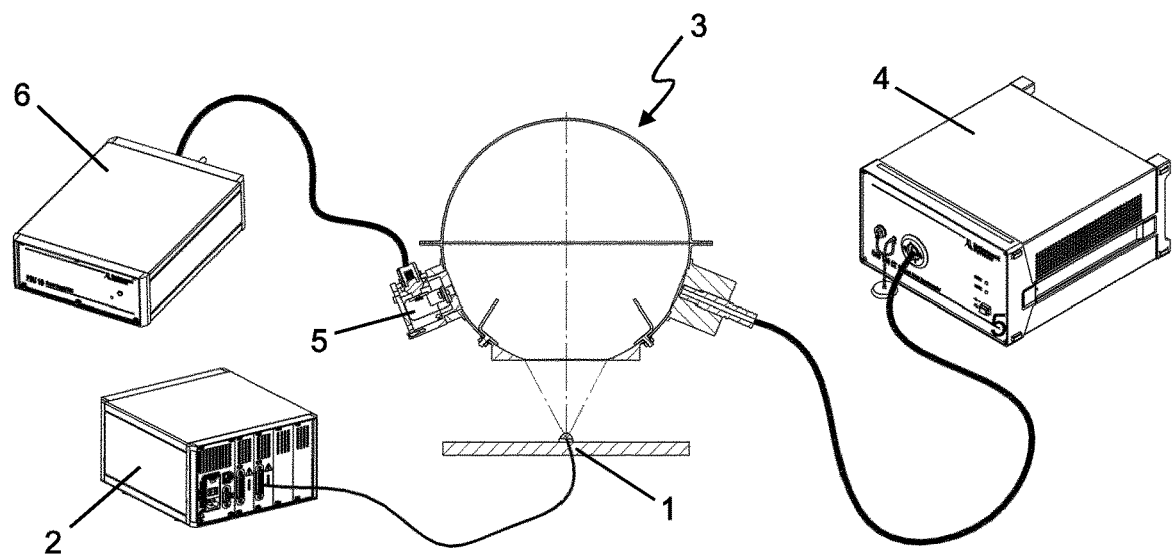

light source (5). Moreover, the invention relates to a device for carrying out the method.

10 Claims, 3 Drawing Sheets

(52) U.S. Cl.
CPC ....... *G01J 3/524* (2013.01); *G01J 2003/2879* (2013.01)

(58) Field of Classification Search
CPC ...... G01J 2003/2879; G01J 3/10; G01J 3/505; G01J 1/08
See application file for complete search history.

(56) References Cited

U.S. PATENT DOCUMENTS

| | | | |
|---|---|---|---|
| 2006/0132760 | A1 | 6/2006 | Imura |
| 2013/0320855 | A1 | 12/2013 | Hulett et al. |
| 2015/0316411 | A1 | 11/2015 | McCord et al. |
| 2017/0261375 | A1* | 9/2017 | Suzuki ...................... G01J 3/28 |
| 2019/0191151 | A1* | 6/2019 | Austin ............... H04N 5/23293 |

* cited by examiner

METHOD AND APPARATUS FOR MONITORING A SPECTRAL RADIOMETER

The invention relates to a method for monitoring a spectroradiometer, in which the spectral data of for example light-emitting test objects are acquired by means of an optical system. Radiometric, photometric and/or colorimetric variables of the test objects are determined from the spectral data.

The invention furthermore relates to a device for carrying out the method.

Many tasks in light measurement technology, in the visible and invisible ranges of the electromagnetic spectrum, are performed, in practice, using spectrometers in order to acquire not only, as for example in the case of simple photodiode detectors, a power value, but rather a power distribution (spectrum) resolved according to wavelengths For example, spectrometers of this kind are used for measuring light-emitting test objects (for example in the production of LEDs). The spectral data of the test objects are acquired using an optical measurement system. The radiometric, photometric and/or colorimetric variables of the test objects can then be determined from these spectral data.

A problem when using spectroradiometers is that, owing to the more complex optics thereof compared with other, simpler detectors, their sensitivity can vary more quickly. For a calibrated measurement system this means that it would measure outside the specifications after a certain time.

The most important influencing variables which are responsible for invalid calibration ("decalibration") are the temperature, and the change due to ageing. The relevant changes can be divided into three categories: Changes in the wavelength scale, changes in the light throughput, and changes in the spectral sensitivity, for example a reduction in the blue sensitivity relative to the red sensitivity.

In order to routinely calibrate a reference light source, it is known from the prior art to measure what are known as "LED standards" having known spectral properties, using the spectroradiometer. In laboratory operation, a standard LED is generally measured prior to the measurement or for example also daily, and a comparison of the measurement results with the known reference values of the LED is performed in order to ensure that the spectroradiometer is measuring correctly. In manufacturing lines, as set out above by way of example, the measuring devices of a production line is compared, for example weekly, with an LED standard, in order to be able to remove the spectroradiometer, beyond the specification, from the line, if necessary. A further known approach is what is known as the "Golden Sample" method, in which a part that is structurally identical to the measuring objects is measured in a quality laboratory and is provided with reference values. In the manufacturing line, the part which is structurally identical to the measuring objects is measured, and the readout values are corrected in accordance with the reference values. It is possible for a plurality of such structurally identical parts to be used, in order to achieve an average.

It is furthermore known (cf. CN 101 784 428) that a second independent measurement system is incorporated, for example a photodiode in a spectroradiometer. This allows for self-diagnosis of the integral sensitivities. However, this does not allow for a diagnosis with respect to spectral errors (for example wavelength shift or spectrum-dependent sensitivity changes).

The object of the invention is that of specifying a method for monitoring a spectroradiometer, in which it is not the on-going recalibration of the spectrometer which is of primary importance, but rather the monitoring as to when calibration is necessary.

This object is achieved by the invention, proceeding from a method of the type mentioned at the outset, in that changes in the wavelength scale, in the light throughput and/or in the spectral sensitivity of the spectroradiometer are detected by means of measurement of a reference light source that is integrated in the optical system and has a known spectrum, on the basis of said reference spectrum.

Optionally, in addition a (highly stable) detector integrated in the optical system is provided, which detector is used for monitoring the stability of the reference light source. In this case, a photodiode can be used as the highly stable detector.

Integration of the reference light source having a known spectrum (for example an LED) into the optical system makes it possible for a deviation of the calibration of the measuring devices, and thus the validity thereof, to be identified. Changes in the reference spectrum can be detected for example in that a spectrum of the reference light source is recorded and stored, at a reference time point at which the validity of the calibration is certain (e.g. following recalibration). In the following course of the use of the spectroradiometer, deviations with respect to the stored spectrum are determined. As a result of the additional integration of the highly stable detector, or also a plurality of detectors (for example one or more photodiodes), the stability of the light-emitting diode (reference light source) used for monitoring the spectrometer is monitored, and thus a two-stage monitoring concept is achieved.

Using the integrated reference light source reduces the technical and time outlay during the (hitherto manual) checking of a calibration of a measurement system. As a result, the downtimes of a production line are reduced, and the productivity is increased. Furthermore, human error when carrying out the check is prevented.

The additional monitoring of the reference light source by the highly stable detector both increases the reliability of the LED used as a reference light source for example, and increases the period of use until the next recalibration.

As already set out above, the method is intended to be used in production lines, in which measurement systems for quality assurance already exist today, and in which the describe manual check of said systems is carried out. This applies, for example in the production of LEDs, to what are known as LED distributors, where the LEDs undergo a quality check and are sorted in different bins. A further example is the production of displays (for example for mobile telephones), in which the measurement system is used in order to balance the displays (for example balancing the gamma curve, the gamut determination, etc.). Use in other measurement systems in which there is a need to adhere to strict specifications is also conceivable, however. In particular in environments having environmental influences such as temperature fluctuations.

A measuring head for light flux (an Ulbricht sphere), a luminance measuring head (telescopic optics), or also an irradiance measuring head (cosine receiver) are advantageously used as coupling optics in the optical system.

A temperature-stabilized LED is advantageously used as the reference light source. The LED can be operated using a constant current, such that, after a certain amount of time, it is in a thermodynamic equilibrium. The spectrum is then acquired in said stable states. Alternatively, the reference light source (LED) is operated in short flashes of light (i.e.

pulsed), specifically in order to ensure a thermal state of the LED that, although not stable, is reproducible.

The reference light source is advantageously integrated into the measurement system as far as possible where the light absorption of the test object usually takes place, such that the optical path of the reference light source and of the measuring objects is as similar as possible. For example, if the receiving optics comprises an Ulbricht sphere, which is coupled to the spectroradiometer using a fiber, the reference light source is preferably likewise incorporated into the Ulbricht sphere.

Advantageously a while LED is used as the reference light source, which LED provides the possibility of individually detecting the three typically relevant changes:
  the wavelength scale can be checked using the blue peak of the spectrum;
  the light throughput can be checked using the change in the signal level;
  a change in the spectral sensitivity can be checked using the spectral shape.

Figure 2:
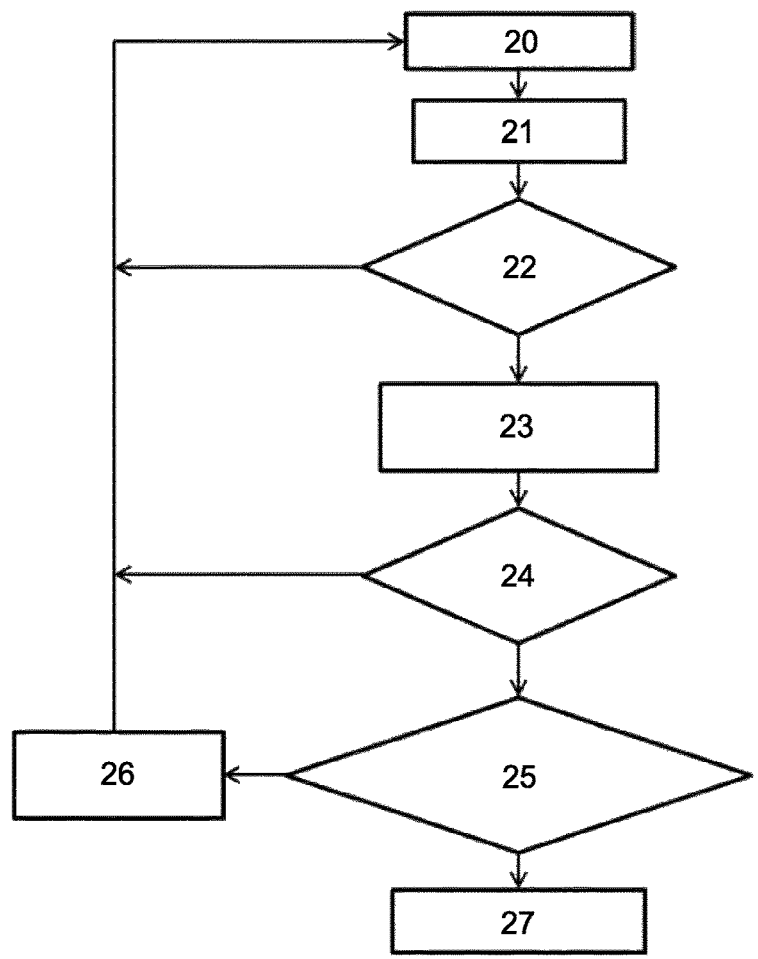
Figure 3:
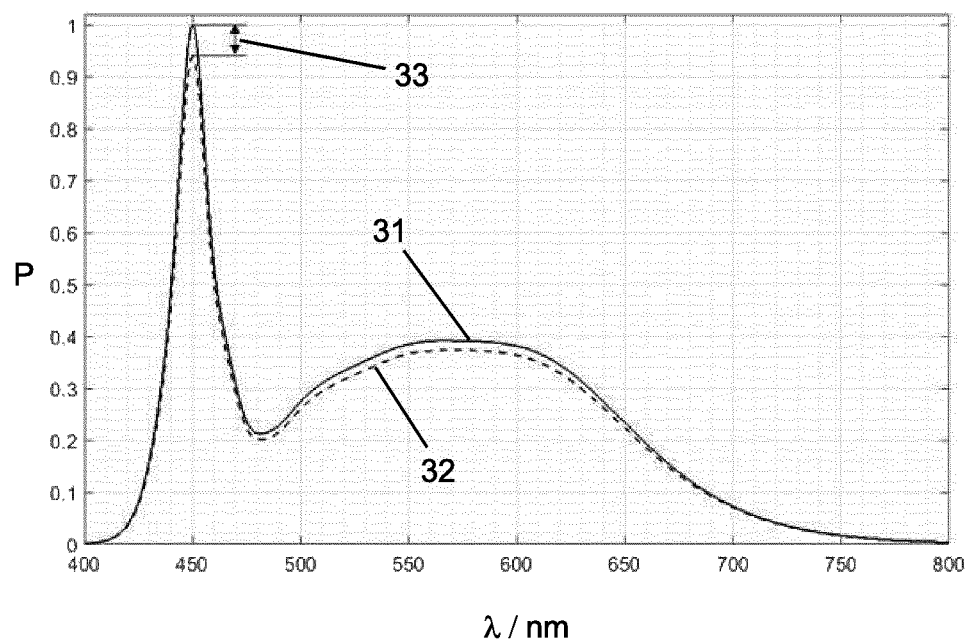
Figure 4:
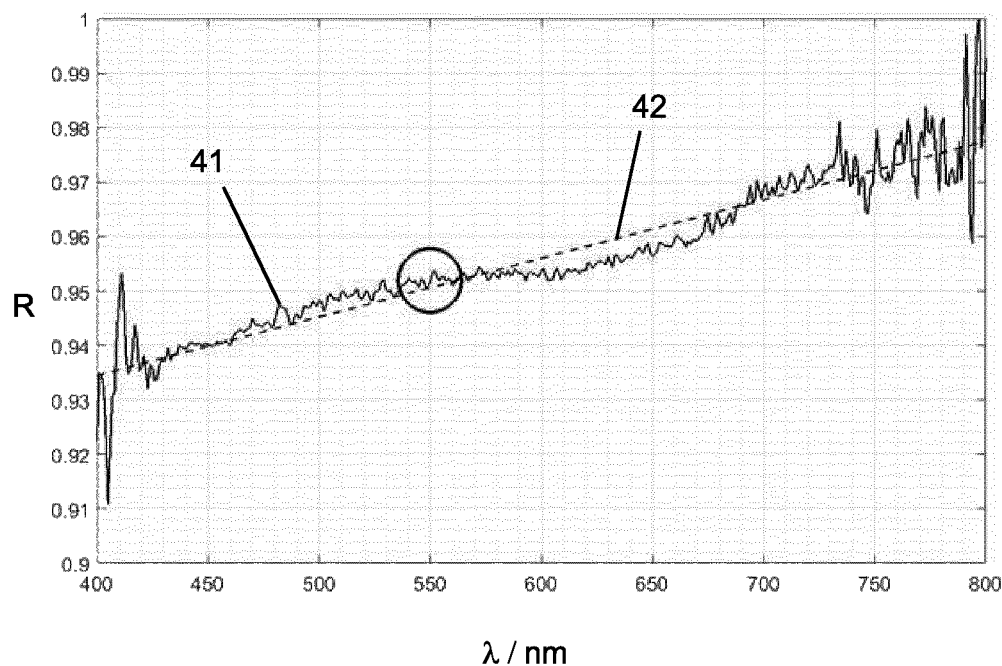
Figure 5:
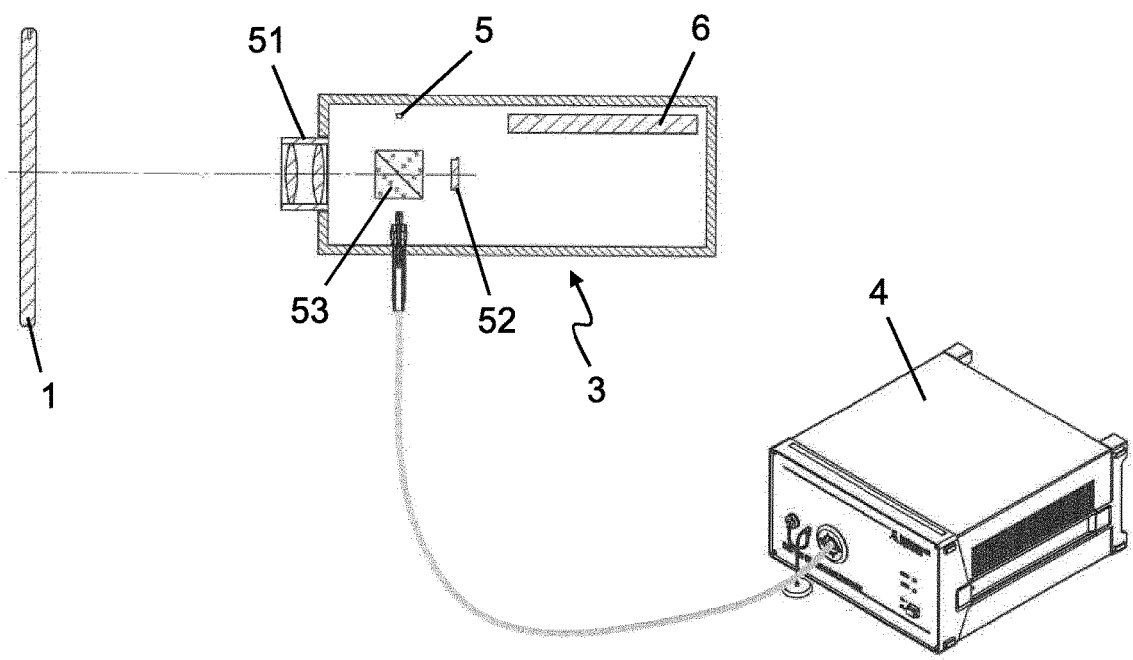

Embodiments of the invention will be shown and explained in the following, with reference to the drawings, in which:

FIG. 1: shows a first embodiment of a device according to the invention;

FIG. 2: shows the method according to the invention as a flow diagram;

FIG. 3: shows a spectrum of a white LED used as a reference light source 5;

FIG. 4: shows a comparison of the reference spectrum and the measured spectrum;

FIG. 5: shows an alternative embodiment of a device according to the invention.

FIG. 1 shows a device according to the invention. A test object 1, which is for example an LED to be measured for the purpose of quality assurance, is operated by means of a power source 2. The emitted light of the LED 1 is received by an optical system, as receiving optics, which comprises a measuring head 3 of a spectroradiometer 4, wherein the measuring head 3 is connected to the spectroradiometer 4 by means of an optical fiber. The receiving optics furthermore comprises a reference light source 5 which is actuated by means of a controllable precision power source 6 and is supplied with electrical energy. The reference light source 5 is for example a white LED having known spectral properties, the light of which is likewise received by the measuring head 3 of the spectroradiometer 4. In the embodiment of FIG. 1, the measuring head 4 comprises an Ulbricht sphere in order to acquire the light emitted by the LED 1 and the light of the reference light source 5, and integrate it over the different emission directions. In this case, the reference light source 5 is integrated, i.e. firmly incorporated, in the Ulbricht sphere. In addition to the measuring head 3, a highly stable photodetector (not shown) is integrated in the optical system, which detector monitors the stability of the emission of the reference light source 5. Furthermore, the device comprises a computer system (not shown) which communicates with the spectroradiometer 4, in order to start the relevant measurement, specify correction parameters, and read out the acquired measuring data. Furthermore, the computer system receives the operating data of the precision power source 6 of the reference light source 5, as well as the measuring data of the highly stable photodetector. It is essential, according to the invention, for the reference light source 5 to be integrated in the optical system that functions as the receiving optics of the device, in order to be able to identify, at any time, a deviation of the calibration of the spectroradiometer 4. The light of the test object 1 and also the light of the reference light source 5 are thus measured using the same measuring assembly consisting of the spectroradiometer 4 and measuring head 3. The two spectral datasets, i.e. the known spectrum of the reference light source 5 and the corresponding measuring data of the spectroradiometer 4, are compared in the computer system, in order to check the validity of the calibration. If the difference between the measured data and the stored calibration data of the reference light source 5 is small enough, i.e. is below a specified threshold, it is possible to perform a corresponding adjustment/correction of the measuring data acquired from the test object 1, by means of the computer system. In parallel with this process, the reference light source 5 is monitored by means of the highly stable photodetector, the measuring data of which are likewise transferred to the computer system, in order to allow for an extremely reliable measurement as a whole. As soon as a deviation in the light emission of the reference light source 5 is identified by the highly stable photodetector, this indicates that the calibration data of the reference light source 5 stored in the computer system (e.g. on account of ageing of the reference light source 5) are no longer valid, and therefore complete recalibration of the system, and possible replacement of the reference light source 5, are required.

FIG. 2 shows the method according to the invention. In step 20, in each case the closest test object 1 to be measured is provided for the measurement, for example in that it is positioned relative to the measuring head 3 of the spectroradiometer 4 in the manner provided. Then, in step 21, the radiometric, photometric and/or colorimetric variables of the test object 1 are measured by means of the spectroradiometer 4. The computer system appropriately actuates the spectroradiometer 4 for this purpose. In step 22, a query is made as to whether it is necessary to check the calibration of the spectroradiometer 4. This can be the case for example following a particular predetermined number of measurements. If the check is not required, the procedure branches back to step 20, and the next test object 1 is supplied and measured. If the outcome of the query is that the calibration should be checked, then in step 23 the reference light source 5 is activated, by means of the precision power source 6, and the light of said light source is measured via the measuring head 3, by means of the spectroradiometer 4. A query is then made, in step 24, as to whether the deviation of the measuring data acquired from the reference light source 5 in step 23, from data of the reference spectrum of the reference light source 5 previously stored in the computer system, is below or above a specified threshold. If the deviation is below the threshold, the method again jumps back to step 20, and the next test objects 1 is positioned and measured. If the deviation of the calibration data is above the threshold, a query is made in step 25 as to whether the deviation is still small enough in order to apply a corresponding correction to the measuring data acquired from the test objects in each case. If this is the case, in step 26 corresponding correction parameters are derived from the comparison of the measuring data acquired from the reference light source 5 by means of the spectroradiometer 4, with the stored reference spectrum of the reference light source 5. The correction data are then applied, in subsequent measuring procedures, to the measuring data acquired from the test objects 1, in order to compensate the identified deviations accordingly. If the identified deviation is too great, complete recalibration of the system takes place in step 27.

FIG. 3 shows the spectrum of a white LED used as a reference light source 5, having the characteristic maxima in the blue and yellow spectral range. A solid curve 31 is shown, which reproduces the known spectrum of the reference light source 5 stored in the computer system. The dashed curve 32 is the power spectrum of the reference light source 5 measured via the measuring head 3, by means of the spectroradiometer 4, in step 23. The two curves 31, 32 clearly deviate from one another. In the region of the peaks at 450 nm, the measured power deviates significantly from the actual power. This is indicated by the double arrow 33.

FIG. 4 correspondingly shows the ratio of the curves 32 and 31 of FIG. 3 as curve 41. It can be seen that the ratio over the entire visible spectral range is significantly below 1.0 (ideal correspondence). At 550 nm for example (shown by the circle), the deviation is approximately 5%. The dashed straight line 42 results from a linear regression of the curve 41. The curve 42 can be derived in step 26 (FIG. 2), in order to be used, in subsequent measuring steps, for corresponding correction of the acquired measuring data.

As the above embodiments show, the method according to the invention has the advantage over the prior art that it is possible to perform monitoring of the calibration of the spectroradiometer 4 by means of the reference light source 5 in shorter time spacings, with minimal outlay, such that the quality and reliability of the measurement results is improved. The time required for the check by means of the reference light source 5 integrated into the receiving optics is only a few seconds. In the case of small deviations, the measuring data can be correspondingly corrected automatically, such that the time intervals between complete recalibration, requiring considerable manual outlay, can be increased. As a result, the useful measuring time and the throughput are increased, while at the same time the quality of the measuring results is greater.

In the embodiment of FIG. 5, the test object 1 is a matrix display which is to be measured for the purpose of quality assurance (e.g. with respect to luminance) and on which a suitable test pattern is reproduced. The emitted light of the display is received by an optical system, as receiving optics, which comprises a measuring head 3 which is connected to a spectroradiometer 4 by means of an optical fiber. The receiving optics furthermore comprises an objective 51 and a CCD image sensor 52. By means of a beam splitter 53, a portion of the light of the display is supplied to the spectroradiometer 4, by means of the optical fiber. A reference light source 5 is integrated into the measuring head 3, which reference light source is actuated by means of a precision power source 6, which is also integrated, and is supplied with electrical energy. The reference light source 5 is for example again, as in the embodiment of FIG. 1, a white LED having known spectral properties, the light of which is likewise supplied to the spectroradiometer 4 by means of the optical fiber. The fundamental approach in monitoring the calibration of the spectroradiometer is described in the embodiment of FIG. 5 as before with reference to FIGS. 1 to 4.

The invention claimed is:

1. A method for monitoring a spectroradiometer (4) used to measure light-emitting test objects (1), in which the spectral data of the test objects (1) are acquired by means of an optical system, wherein radiometric, photometric and/or colorimetric variables of the test objects (1) are determined from the spectral data, wherein changes in the wavelength scale, in the light throughput and/or in the spectral sensitivity of the spectroradiometer (4) are detected by a reference light source (5) integrated in the optical system and wherein the light of the test object (I) is received by the optical system as the receiving optics, which comprises a measuring head (3) that is connected to the spectroradiometer (4) via an optical connection, as well as an objective (51) and an image sensor (52), wherein a portion of the light of the test object (1) is supplied to the spectroradiometer (4) by means of a beam splitter (53) via the optical connection and wherein the reference light source (5) is integrated in the measuring head (3) and has a known spectrum by means of which the calibration of the spectroradiometer is monitored, wherein the stability of the reference light source (5) is monitored by means of the image sensor (52).

2. The method according to claim 1, wherein the reference light source (5) is an LED having a precision power source (6).

3. The method according to claim 1, wherein the reference light source (5) is operated such that it stabilizes in a thermodynamic equilibrium.

4. The method according to claim 1, wherein the reference light source (5) is operated in a pulsed manner.

5. The method according to claim 1, wherein a white LED is used as the reference light source (5).

6. A device for monitoring a spectroradiometer (4) used to measure light-emitting test objects (1), comprising a spectroradiometer (4) and an optical system, coupled to said spectroradiometer (4), as receiving optics for light originating from a test object (1), wherein a reference light source (5) is integrated into the receiving optics, wherein the receiving optics further comprise a measuring head (3) that is connected to the spectroradiometer (4) via an optical connection, as well as an objective (51) and an image sensor (52), wherein a beam splitter (53) is configured to supply a portion of the light of the test object (1) to the spectroradiometer (4) via the optical connection, and wherein the reference light source (5) is integrated in the measuring head (3) and has a known spectrum by means of which the calibration of the spectroradiometer is monitored.

7. The device according to claim 6, wherein the reference light source (5) is an LED.

8. The device according to claim 6, wherein the optical connection is configured as an optical fiber.

9. The device according to claim 6, wherein the image sensor (52) is a CCD image sensor (52).

10. The device according to claim 6, wherein the reference light source (5) is temperature-stabilized and is operated by means of a precision power source (6).

* * * * *